United States Patent [19]

Drossbach

[11] Patent Number: 5,124,109
[45] Date of Patent: Jun. 23, 1992

[54] METHOD FOR PRODUCING A DOUBLE WALL PIPE

[75] Inventor: Hubert M. Drossbach, Bavaria, Fed. Rep. of Germany

[73] Assignee: Contech Construction Products Inc., Middletown, Ohio

[21] Appl. No.: 622,389

[22] Filed: Nov. 29, 1990

Related U.S. Application Data

[63] Continuation of Ser. No. 290,696, Dec. 27, 1988, which is a continuation of Ser. No. 772,401, Sep. 4, 1985, Pat. No. 4,846,660, which is a continuation-in-part of Ser. No. 632,040, Jul. 18, 1984, abandoned.

[30] Foreign Application Priority Data

Apr. 12, 1985 [DE] Fed. Rep. of Germany ....... 3513708

[51] Int. Cl.⁵ .............. B29C 49/04; B29C 49/30; B29C 53/22
[52] U.S. Cl. .............. 264/508; 156/156; 156/205; 156/244.15; 156/285; 156/290; 264/173
[58] Field of Search ......... 264/173, 508; 425/112, 425/113, 133.1, 134, 326.1, 380, 382 R, 387.1, 403, 503, 504, 505, 523, 526, 532, 539; 156/156, 202, 205, 244.14, 244.15, 285, 290, 324, 462, 470, 471, 500; 138/121, 122, 148, 173, DIG. 7

[56] References Cited

U.S. PATENT DOCUMENTS

| | | | |
|---|---|---|---|
| Re. 30,338 | 7/1980 | Kauder | 524/181 |
| 3,280,430 | 10/1966 | Antrobus | 425/532 X |
| 3,412,189 | 11/1968 | Sullivan | 264/565 |
| 3,538,209 | 11/1970 | Hegler | 264/508 |
| 3,677,676 | 7/1972 | Hegler | 425/504 |
| 3,743,456 | 7/1973 | Cini | 425/112 |
| 3,872,893 | 3/1975 | Roberts | 138/121 |
| 3,994,646 | 11/1976 | Hauck | 425/133.1 |
| 3,996,323 | 12/1976 | Hegler et al. | 264/508 |
| 4,021,169 | 5/1977 | Heilmayr et al. | 425/71 |
| 4,303,104 | 12/1981 | Hegler et al. | 138/121 |
| 4,305,703 | 12/1981 | Lupke et al. | 425/133.1 |
| 4,487,232 | 12/1984 | Kanao | 138/122 |
| 4,510,013 | 4/1985 | Lupke et al. | 156/205 X |

Primary Examiner—Leo B. Tentoni
Attorney, Agent, or Firm—Wood, Herron & Evans

[57] ABSTRACT

Pipe made from thermoplastic polymeric material and including a transversely corrugated outer wall and a smooth inner wall of constant diameter fusion welded to the inner crests of the corrugations of the outer wall is produced by an improved method involving simultaneous extrusion of two tubes, blow molding of the outer wall and fusion of the two walls while the inner wall is supported by an internal shaping and cooling mandrel. Even when the polymeric material is polyvinyl chloride, good fusion welds and lack of brittleness are achieved by the manner in which extrusion is carried out, control of the location at which the fusion welds are established, and the extrusion formulation. The finished pipe is characterized by the fact that, when the fusion welded areas have been cut for inspection, no line of demarcation between the materials of the two walls can be observed.

9 Claims, 4 Drawing Sheets

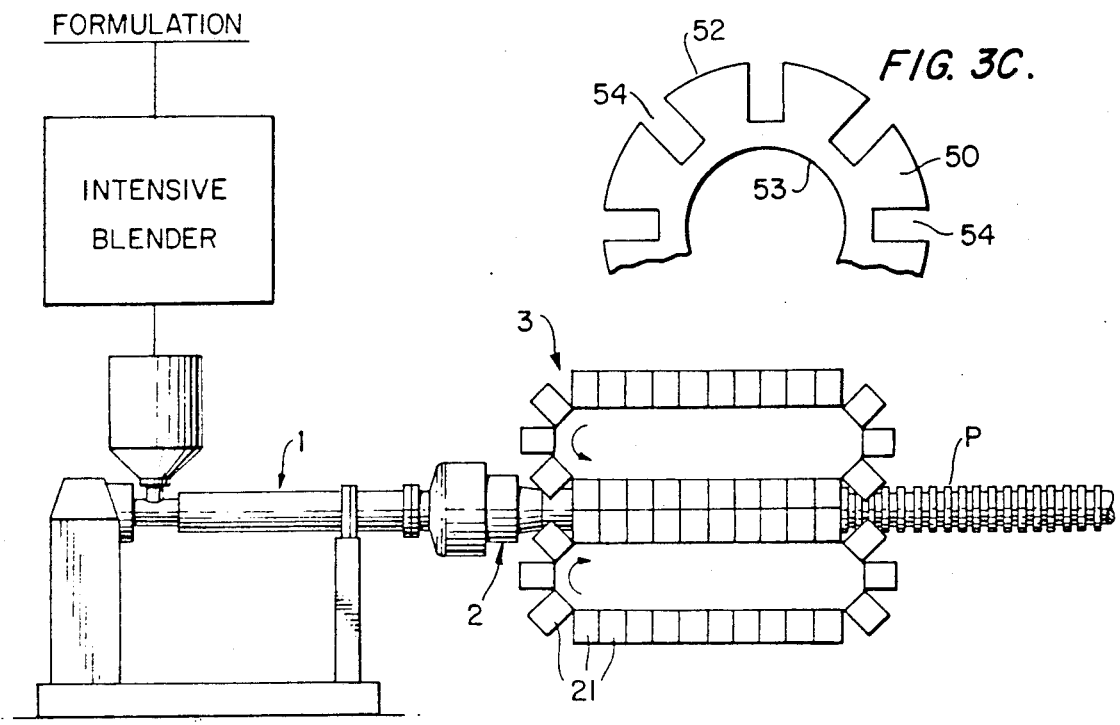
FIG. 1.
FIG. 3C.
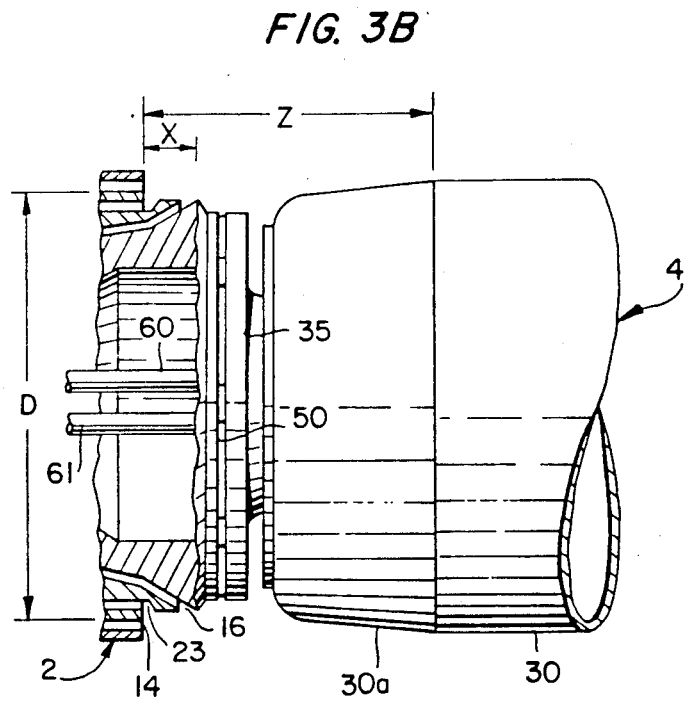
FIG. 3B

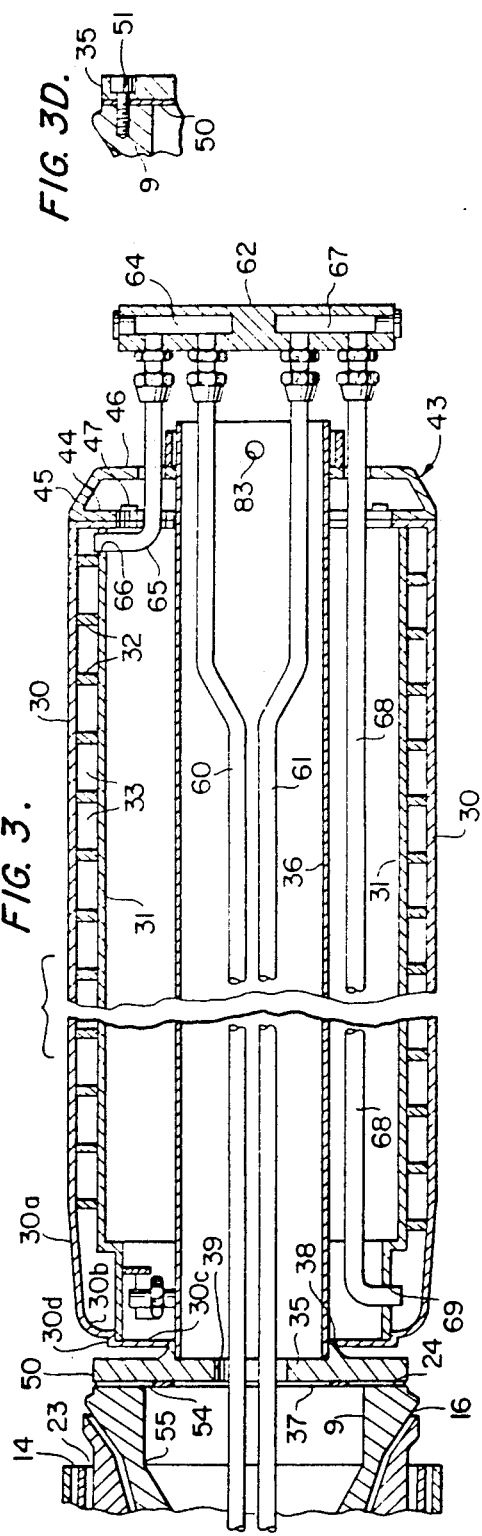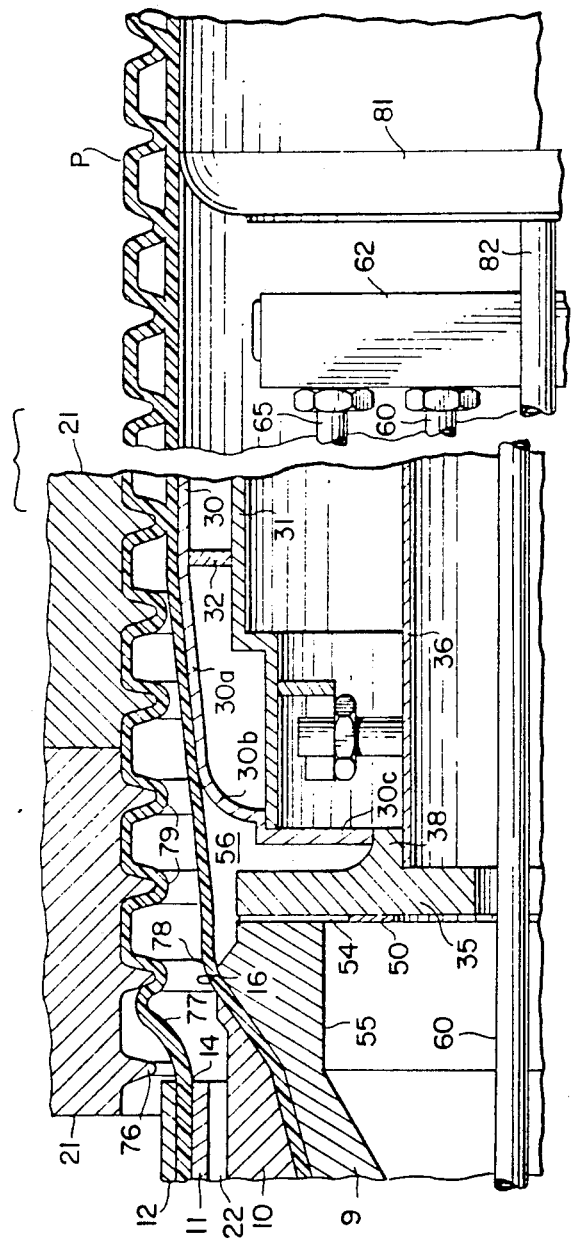

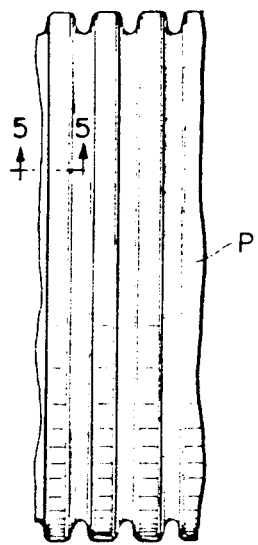
FIG. 4
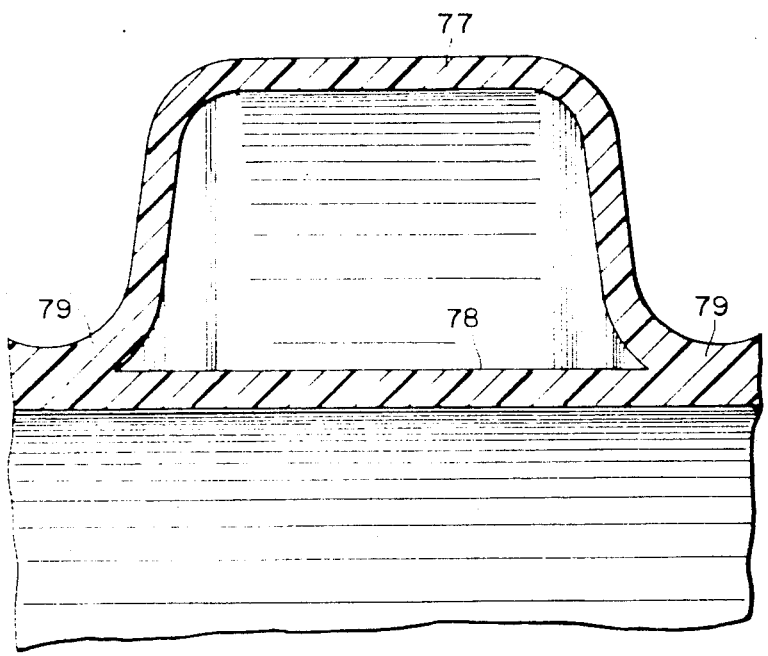
FIG. 5
FIG. 6

METHOD FOR PRODUCING A DOUBLE WALL PIPE

This application is a continuation, of application Ser. No. 290,696, filed Dec. 27, 1988, which in turn is a continuation of application Ser. No. 722,401, filed Sept. 4, 1985, now U.S. Pat. No. 4,846,660, issued Jul. 11, 1989, which in turn is a continuation-in-part of application Ser. No. 632,040, filed Jul. 18, 1084, now abandoned.

This invention relates to the production double wall pipe having a transversely corrugated outer wall and a smooth inner wall and is especially applicable to the production of such pipe from polyvinyl chloride.

BACKGROUND OF THE INVENTION

It has long been known to produce from thermoplastic polymeric material a double wall pipe the outer wall being corrugated generally transversely of the pipe, the inner wall being smooth and uncorrugated, the inner wall and outer wall being fused together at the inner crests of the corrugations of the outer wall. Pipes of this type are produced by simultaneously extruding both an inner and outer tube; while still in the plastic state, inflating the outer tube against a surrounding mold which moves with the extruded outer tube, so as to corrugate the outer tube, and then urging the inner tube against the inner crests of the corrugations of the outer tube, again while the material of both tubes is still in a plastic state. Typical methods and apparatus of the prior art are disclosed in the following USA patents:

| | |
|---|---|
| 3,280,430 | Antrobus |
| 3,538,209 | Hegler |
| 3,677,676 | Hegler |
| 3,743,457 | Cini |
| 3,994,646 | Hauck |
| 3,996,323 | Hegler et al |
| 4,305,703 | Lupke et al |

When the polymeric material employed has been polyethylene, the methods and apparatus employed by prior-art workers have been quite successful, and such double wall pipe of polyethylene has become a common article of commerce. However, though extensive work appears to have been done, little commercial success has heretofore been achieved in attempting to extrude and form such double wall pipe from polyvinyl chloride, despite the fact that polyvinyl chloride is well known to have the superior characteristics which would make it possible for such double wall pipe to have the higher engineering properties required, e.g., for use as sewer pipe. In at least most cases, polyvinyl chloride pipe produced according to the prior art appears to have been characterized by either excessive brittleness, inadequate fusion between the two walls, or both.

Reasons for difficulties encountered in the prior art are not completely understood. One important factor is that polyethylene, with which prior workers have succeeded, loses heat less quickly than does polyvinyl chloride, so that prior-art workers using polyethylene have been able to bring the inner tube into engagement with the crests of the corrugated outer tube while both tubes are still at temperatures adequate for good fusion, but have not been able to do so with polyvinyl chloride. It is also likely that the flow patterns to which the plastic material has been subjected in order to achieve fusion of the two walls have resulted in constrained flow shear which, when a polymer such as polyvinyl chloride is employed, causes the product to be excessively brittle. Regardless of the reasons for the difficulties encountered in the prior art, there has been a continuing demand for double wall pipe of the type referred to made from polyvinyl chloride and having the engineering characteristics required when the pipe is to be used as sewer pipe or for like purposes.

SUMMARY OF THE INVENTION

The invention accomplishes improved production of double wall pipe of the type described from any thermoplastic polymeric material which is suitable for such pipe, and provides particular improvements when employed for making such pipe from extrusion formulations based on polyvinyl chloride as the primary resin.

Double wall polyvinyl chloride pipe according to the invention has two unique characteristics. First, the fused joints between the inner wall and the inner crests of the corrugations of the outer wall are such that, when the pipe has been fractured by impact testing according to ASTM D 2444-80 and a specimen then obtained by making a cut through one of the fused joints transverse to the corrugation, a scanning electron micrograph of the cut face at an enlargement of 20X exhibits no line of demarcation between the material of the inner wall and that of the inner crest of the outer wall corrugation at the fused joint which can be seen by observing the micrograph with the naked eye. Second the pipe exhibits good impact performance when tested according to ASTM D 2444-80 at a mean value of 160 foot pounds for 200 mm. (8 in.) pipe, such good impact performance indicating very little brittleness such as might be caused by improper fusion or thermally degraded resin.

According to the invention, two concentric tubes of the polymeric material are extruded concurrently through a die having a first annular die orifice of larger diameter and a second annular die orifice of smaller diameter, the two orifices being coaxial and the second orifice being spaced from the first orifice in the extrusion direction by a distance which can be zero and, regardless of the diameter of the pipe being extruded, does not exceed about 2.5 in. (64 mm.). Advantageously, the second die orifice is spaced from the first orifice in the extrusion direction by a distance which does not exceed a value such that the ratio of that distance to the inner diameter of the first die orifice is about 1:4, that ratio more advantageously being in the range of from about 1:8 to about 1:22. Advantageously, a polyvinyl chloride extrusion composition is advanced through the barrel of a conventional screw extruder by action of the screw as a melt at 360–420° F. (188–216° C.) and divided into two concentric flow passages each leading to a different one of the die orifices, while maintaining the die at a temperature which is advantageously near the melt temperature at the barrel exit and in all events not significantly above the degradation temperature of the polyvinyl chloride. Best results are achieved when the temperature of the polymeric material at the die lips is maintained at 380°±10° F. (193.3°±5.56° C.). Upon emerging from the first die orifice, the outer tube is inflated immediately into molding engagement with a surrounding travelling die by air or other suitable gas supplied via a passageway located between and advantageously concentric with the flow passages which lead the molten polymeric material to the respective die orifices. After emerging from the second die orifice, the inner tube is subjected to an internal gas pressure adequate to oppose the tendency for the gas pressure between the two tubes to deflect the inner tube inwardly and is led onto a shaping and cooling mandrel the outer surface of which commences at an upstream tip which is spaced from the smaller die orifice by a small distance in the extrusion direction and which tapers outwardly to a point of larger transverse dimension substantially equal to the inner diameter of the pipe to be produced. Thus, the point of larger dimension of the outer surface of the mandrel determines the location at which fusion between the inner tube and the inner crests of the corrugations of the outer tube commences, and the space between that point and the larger die orifice is minimized in such fashion that the polymeric material of both tubes is still at a temperature of good fusion when the two tubes come into engagement. While the axial spacing between the larger die orifice and the point at which the inner tube is first urged against the inner crests of the corrugated outer tube can vary depending upon the size of pipe being formed, the temperature of the polymeric material at the die lips, the temperature of the inflating gas, and the nature of the particular resin being extruded, that spacing advantageously does not exceed the diameter of the pipe being produced and, particularly as the pipe diameter increases, can advantageously be less than the pipe radius. The double wall pipe so formed is maintained substantially in engagement with the shaping and cooling mandrel until the polymeric material has cooled to substantially rigid condition.

IDENTIFICATION OF THE DRAWINGS

FIG. 1 is a semidiagrammatic side elevational view of an extruder, die and travelling mold device for carrying out the method;

FIG. 3 is a longitudinal cross-sectional view of the cooling mandrel;

FIG. 3A is a semidiagrammatic view, similar to FIG. 3 but enlarged with respect thereto and illustrating the manner in which the outer and inner tubes are extruded and formed according to the invention;

FIG. 3B is a fragmentary view, partly in longitudinal cross section and partly in elevation, identifying certain dimensional relationships;

FIG. 3C is a fragmentary elevational view of a spacing disc forming part of the apparatus and serving to allow flow of gas under pressure to the interior of the inner extruded tube in a location between the extrusion die and the shaping and cooling mandrel;

FIG. 3D is a fragmentary longitudinal sectional view illustrating the manner in which the shaping and cooling mandrel is secured to the extrusion die;

FIG. 4 is a fragmentary side elevational view of a double wall pipe produced with the apparatus of FIGS. 1-3 according to the invention;

FIG. 5 is a fragmentary longitudinal cross-sectional view, enlarged with respect to FIG. 4, taken generally on line 5—5, FIG. 4; and FIG. 6 is a scanning electron micrograph at 20X taken generally on line 5—5, FIG. 4.

DETAILED DESCRIPTION OF THE INVENTION

The Apparatus of FIGS. 1-3D

Figure 2:
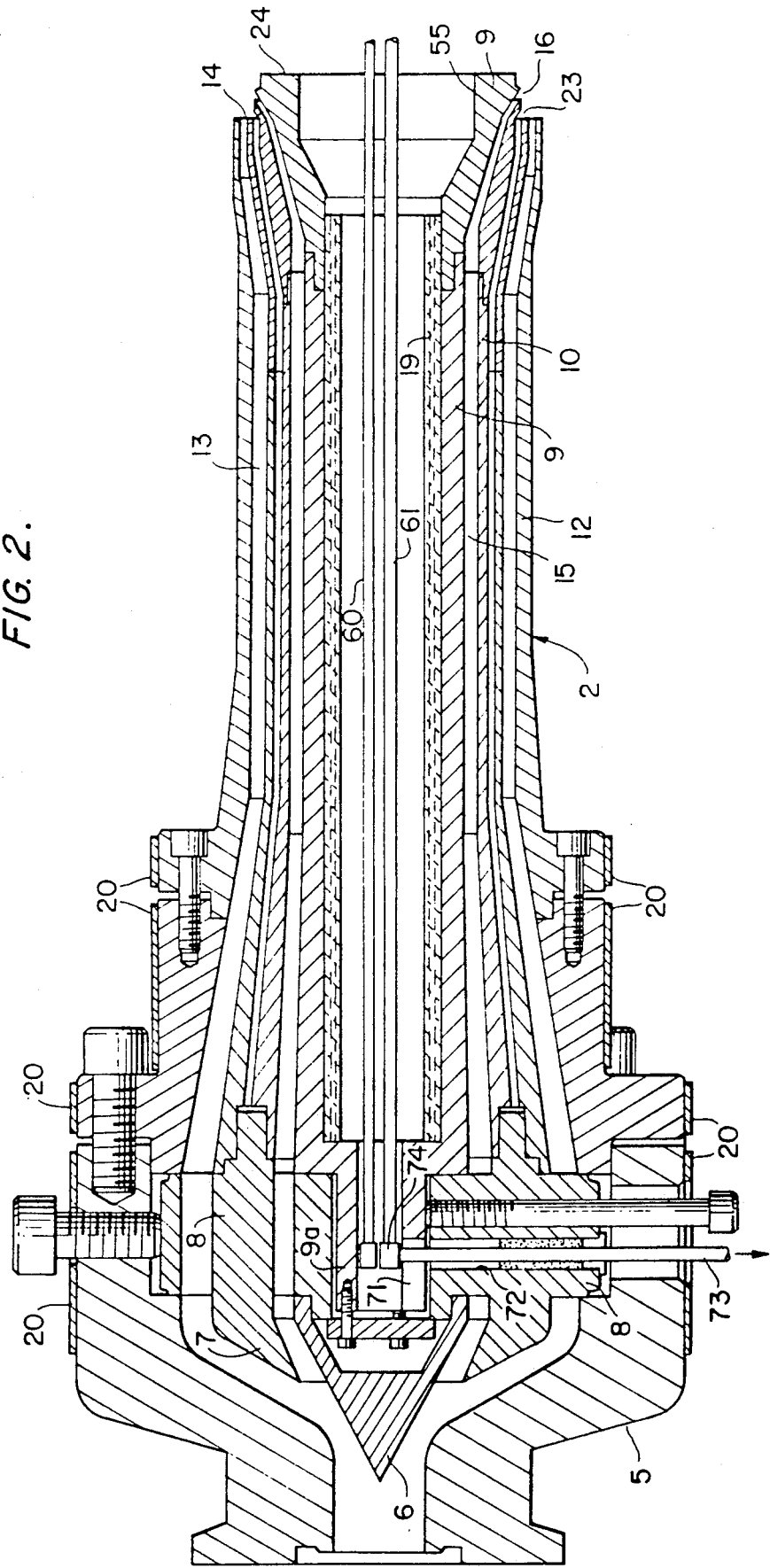
FIG. 2 is a longitudinal cross-sectional view, enlarged with respect to FIG. 1, of the extrusion die.

In order that the method can be more readily understood, one typical apparatus for carrying out the method will be described with reference to FIGS. 1-3D. The polymeric formulation to be extruded is formed as a free-flowing dry mix, advantageously by means of a centrifugal intensive blender, and the mix is fed continuously to the feed hopper of a conventional screw type extruder 1 equipped with a die 2, a travelling mold device 3 and an elongated shaping and cooling mandrel 4. The extruder is conventionally equipped with electrical resistance heaters, the action of the extruder screw and heaters being effective to achieve the desired melt temperature.

As seen in FIG. 2, die 2 comprises a die body 5 which contains dual flow-directing torpedoes 6 and 7 which are generally conical, taper toward the output end of the extruder barrel and are carried by a dual spider 8. The die also includes a tubular innermost mandrel 9, a tubular barrel 10 which surrounds mandrel 9 and is concentric therewith, a second tubular mandrel 11 which surrounds barrel 10 and is concentric therewith, and an outer barrel 12 which surrounds mandrel 11 and is concentric therewith. Mandrel 11 and barrel 12 of the die are spaced apart radially to define a first flow passage 13 which leads from outer torpedo 7 to a first circular die orifice 14. Mandrel 9 and barrel 10 are spaced apart radially to define a second flow passage 15 which leads from inner torpedo 6 to a second circular die orifice 16. Die orifice 16 is smaller than orifice 14 and concentric therewith. Orifice 16 is spaced from orifice 14 in the extrusion direction by a distance X, FIG. 3B, which can be zero and does not exceed a value such that the ratio of distance X to the inner diameter of orifice 14 is about 1:4, distance X advantageously being such that that ratio is in the range of from about 1:8 to about 1:22.

Outer torpedo 7 and the outer portion of spider 8 direct a portion of the total melt flow from the extruder barrel into a tubular flow which is forced forwardly via passage 13 to die orifice 14. The surfaces presented by the torpedos and the outer portion of the spider define a smooth transitional flow path from the exit of the extruder to the beginning of passage 13, and passage 13 is then straight-walled and only slightly tapering so that the possibility of confined shear or rolling of the polymeric material is avoided. The die lips which define orifice 14 are right circular cylindrical surfaces concentric with and lying in a common plane transverse to the longitudinal axis of the die, and the molten plastic emerging from orifice 14 is therefore in the form of a cylindrical tube. The surfaces presented by the torpedos and the inner portion of the spider also define a smooth transitional flow path from the exit of the extruder barrel to passage 15, and passage 15, while tapering slightly forwardly in radial cross section, is essentially straight until near the locations of the die orifices. There, passage 15 flares outwardly and forwardly in generally frustoconical fashion and the die lips of orifice 16 are extensions of the frustoconical walls of the forward end of passage 15 so that the molten plastic emerging from orifice 16 is directed outwardly as well as forwardly.

Innermost mandrel 9 accommodates a supply tube 17 via which coolant is supplied to shaping and cooling mandrel 4, an exhaust tube 18 which leads coolant from mandrel 4, and inner heating bands 19 to supply heat to the die from within. External heating bands 20 are provided on the outer barrel of the die, the die body and adjacent the adaptor flange by which the die is mounted on the extruder barrel.

Travelling mold 3 can be of any conventional type for corrugating an extruded plastic tube and is advantageously of the kind comprising two set of half-molds 21, each corresponding pair of half-molds of the two sets being capable of being fitted about the extruded tube, and the sets of half-molds being carried by endless carriers so that each pair of half-molds can be closed and, when closed, can be moved in the extrusion direction at a rate of travel dependent upon the extrusion rate. Travelling molds of this type are disclosed, for example, in U.S. Pat. No. 3,280,430 to Antrobus.

The space between die barrel 10 and mandrel 11 constitutes a gas flow passage 22 to which compressed air or other suitable gas is supplied via a connection (not shown) within the die body and which leads forwardly to a circular discharge orifice 23 which is smaller than and spaced inwardly from first die orifice 14 so as to be located between orifices 14 and 16. The internal cross section of the innermost die mandrel 9 is larger than is necessary to accommodate coolant supply and exhaust tubes, as later explained, so that the bore of mandrel 9 can also conduct a compressed gas supplied via a fitting (not shown) within the die body. Inner mandrel 9 projects forwardly a significant distance beyond the inner extrusion orifice 16 and terminates in an annular transverse flat end face 24.

Shaping and cooling mandrel 4, as seen in FIG. 3, is a generally tubular unit comprising an outer wall 30 and an inner wall 31 concentric with wall 30, the two walls being separated by a helically extending partition 32 secured at its edges to the respective walls in fluid-tight fashion so that walls 30, 31 and partition 32 define a helical duct 33. Throughout most of its length, outer wall 30 presents a right circular cylindrical outer surface. However, at its left end (as viewed in FIGS. 3–3B) outer wall 30 has a portion 30a which tapers inwardly at a shallow angle in frustoconical fashion, terminating in a tip portion 30b which curves smoothly inwardly to join a flat transverse annular end wall portion 30c which is offset axially from portion 30b by a short axially extending annular portion 30d.

Mandrel 4 also comprises a mounting plate 35 and a central tube 36. One face 37 of plate 35 is flat throughout the circular extent of the plate. The opposite face of plate 35 has a circular hub 38 which is concentric with the circular outer peripheral edge of the plate and has an inner diameter such as to embrace one end of tube 36, that end of tube 36 being rigidly secured to the hub. The inner periphery of end wall portion 30c of member 30 embraces and is rigidly secured to the outer periphery of hub 38. As best seen in FIG. 3A, the outer periphery of plate 35 is of a diameter significantly smaller than the diameter of extrusion orifice 16. Plate 35 has a central axial bore 39. At its end opposite plate 35, outer wall 30 has a transverse annular inturned end flange 42 to which the corresponding end of inner wall 31 is secured in fluid-tight fashion. Secured to the outer surface of flange 42 is an end member 43 having a flat transverse annular end wall 44, a frustoconical outer wall 45 which tapers inwardly away from the mandrel, and a flat transverse annular end wall 46 having a central opening through which the corresponding end portion of tube 36 extends, the inner periphery of wall 46 being secured to tube 36 in fluid-tight fashion. Member 43 is rigidly attached to flange 42, as by circumferentially spaced fasteners 47.

A spacing plate 50 overlies face 37 of mounting plate 35 and the mounting plate (and therefore mandrel 4) is rigidly secured to the tip of die mandrel 9, as by screws 51 in the manner shown in FIG. 3D, plate 50 thus being clamped between faces 24 and 37. As seen in FIG. 3C, plate 50 is annular, having a circular outer periphery 52 and a circular inner periphery 53. A plurality of rectangular notches 54 extend radially with respect to the plate and open outwardly through outer periphery 52. As best seen in FIG. 3A, the radial length of notches 54 is such that, in the final assembly, the inner ends of the notches are spaced inwardly from the inner surface 55 of the tip of mandrel 9. Thus, air or other gas supplied under pressure to the bore of inner mandrel 9 of die 2 is delivered not only to the interior of tube 36 of mandrel 4 but also, via notches 54, to annular space 56, FIG. 3A, between the tip of the die and the adjacent end of mandrel 4.

A supply tube 60 and an exhaust tube 61 extend through the bore of die mandrel 4, through the central openings in plates 35 and 50 and completely through tube 36 of mandrel 4, projecting from the end of tube 36 and being connected to a manifold 62, FIG. 3. Tube 60 communicates with one end of duct 64 of the manifold, the other end of duct 64 communicating with one end of a tube 65 which extends through openings in walls 46 and 44 of member 43 and has its other end bent outwardly and sealed within a radial opening 66 in wall 31 so as to communicate with the end of duct 33 adjacent the manifold. Tube 61 communicates with one end of duct 67 of manifold 62, the other end of duct 67 communicating with one end of a tube 68 which has its other end bent outwardly and sealed in opening 69 in wall 31 so as to communicate with the end of helical duct 33 nearest the die. Tubes 60, 61, 65 and 68 are rigid and self-supporting, and manifold 62 is supported entirely by those tubes.

As shown in FIG. 2, spider 8 of die 2 has a central bore which accommodates an extension 9a of inner die mandrel 9, the extension being hollow and having two radial slots, one of which is indicated at 71. For each of tubes 60 and 61, the spider has a radial tore 72 in which is rigidly secured a tube communicating with the respective one of tubes 60 and 61. Thus, tube 73 extends through one bore 72 and is connected to the end of tube 61, as by fitting 74, to conduct coolant fluid from tube 61 to a point outside of the die. A second tube 73 (not shown) is similarly provided and connected to the end of tube 60 to conduct coolant fluid from a source external to the die into tube 60. A third tube (not shown) simply communicates with the bore of extension 9a for the supply of gas under pressure via the bore of mandrel 9 to notches 54 and to the interior of tube 36 of mandrel 4. All three tubes are sealed in fluid-tight fashion to the surrounding wall of the respective bore 73.

Since mandrel 4 is rigidly secured to die 2, and since the mandrel is itself a rigid unit, the mandrel is held coaxial with respect to the longitudinal axis of die 2. The outside diameter of outer wall 30 of mandrel 4 is smaller than the inner diameter of the inner crests 76 of the corrugations of mold halves 21 by a distance essentially equal to the combined thickness of the walls of the tubes 77 and 78 extruded respectively from die orifices 14 and 16. Considering FIG. 3A, it will be understood that inner crests 76 of the mold halves, once the mold halves have closed about the die in the fashion seen in FIG. 1, lie in a common right circular cylindrical plane and that that cylindrical plane is concentric with and spaced outwardly from the right circular cylindrical portion of the outer surface of outer wall 30 of the mandrel. In operation, air or other gas under pressure is supplied via orifice 23 and via notches 54 simultaneous with extrusion of the polymeric material via orifices 14 and 16. As outer tube 77 emerges from die orifice 14, pressure of the gas admitted via orifice 23 immediately inflates the outer tube into conformity with the corrugating surfaces presented by the die halves 21. Inner tube 78, emerging from die orifice 16, comes first into embracing engagement with rounded tip portion 30b of outer wall 30 of mandrel 40 and proceeds to travel along tapered portion 30a of the mandrel outer wall. Pressurized gas emerging from the radial vents defined by notches 54 of plate 50 and faces 24 and 37 provides pressure in space 56 adequate to prevent undue inward deflection of tube 78 to the gas pressure between tubes 77 and 78. As simultaneous extrusion of the two tubes continues, tube 78 progresses up the inclined surface portion 30a to the point at which surface portion 30a joins the right circular cylindrical outer surface of wall 30. At that joint, the shaping function of mandrel 4 has served to bring tube 78 to a position in which it will be directly engaged with the approaching one of the inner crests 79 of the now-corrugated outer tube 77, it being understood that mold halves 21 are moved along the mandrel at the extrusion rate, with crests 79 advancing as the mold halves advance.

As shown in FIG. 3B, inner die orifice 16 is spaced axially from outer die orifice 14 in the extrusion direction by a small distance X. The value of distance X in all events does not exceed 2.5 in. (64 mm.) and, advantageously, is such that the ratio of distance X to the inner diameter D of the outer extrusion orifice (which is essentially the diameter of the pipe) is within the range of from about 1:4 to about 1:22, values for X such that the ratio is in the range of from about 1:8 to about 1:22 being most advantageous. The point at which surface portion 30a joins the right circular cylindrical main outer surface portion of wall 30 of mandrel 4 is spaced axially from outer die orifice 14 in the extrusion direction by a distance Z. Therefore, as will be clear from FIG. 3B, the point at which the inner extruded tube 78 comes into engagement with inner crests 79 of the corrugated outer tube is also spaced from die orifice 14 by the distance Z. Advantageously, the value of distance Z does not exceed distance D. When pipes of larger diameter are to be produced, distance Z advantageously is less than the radius of the pipe to be produced, that is, less than one half of distance D. Thus, in effect, distance Z is the limit of the generally axial travel of tube 78 before tubes 77 and 78 are forced together, by coaction of the shaping and cooling mandrel and the travelling mold device, to accomplish fusion of the inner tube and the inner crests of the corrugations of the outer tube. With the temperatures of the melt and of the extruded material at the die lips controlled as described, the dimensional relationships described assure that the temperatures of tubes 77 and 78 will be approximately the same and at a value assuring good fusion between the two tubes when the inner tube comes into fusing contact with inner crests 79 of the outer tube.

Once the two tubes have been fused together, the resulting double wall pipe P advances under the action of travelling mold device 3. Thus, the pipe traverses all of the cylindrical outer surface of wall 3 of mandrel 4 and, in doing so, is cooled by the coolant flowing through helical duct 33 generally countercurrent to the movement of the pipe. The cooling action of the mandrel lowers the temperature of the pipe sufficiently to completely solidify the polymeric material of the pipe and render the pipe self-sustaining.

Since the supply of pressurized gas to space 56 via notches 54 requires that the gas not be able to escape freely from tube 36 of the mandrel into the bore of pipe P as the pipe is hauled off, a conventional wiper type seal 81, FIG. 3A, carried by arms 82 having, e.g., inturned ends engaged in diametrically opposed apertures 83, FIG. 3, in the projecting end portion of tube 36. The wiper seal 81 is circular and slidably engaged in sealing relation with the inner surface of pipe P as the pipe comes off the mandrel.

CARRYING OUT THE METHOD WITH THE APPARATUS OF FIGS. 1-3D

Using an intensive blender, a free-flowing dry blend is prepared comprising

| Ingredient | Percent by Weight |
| --- | --- |
| Polyvinyl chloride | 85-93.5 |
| Calcium carbonate | 1.5-10.0 |
| Polymeric processing aid | 1.5-5.0 |
| Chlorinated polyethylene as modifier | 1.0-7.0 |
| Petroleum wax | 1.0-3.0 |
| Titanium dioxide | 0.5-3.0 |
| Calcium stearate | 0.25-0.5 |
| Carbon black pigment | 0.2-0.5 |
| Antimony stabilizer | 0.2-0.5 |
| Polyethylene wax | 0.1-0.2 |

The dry blend is supplied continuously to the feed hopper of the extruder and the extruder operated to maintain a melt temperature of 360-420° F. (182-216° C.) at barrel exit. The heating bands of the die are operated to maintain the die temperatures near the melt temperature, and to maintain the temperature of the extruded material at the die lips at 380°±10° F. (193.3°±5.56° C.). As extrusion commences, gas under pressure is provided through passage 22 and orifice 23 at 5-11 psi. to inflate the outer extruded tube against the travelling mold halves 21 and into the corrugation cavities thereof. Simultaneously, air under pressure is supplied through the bore of innermost die mandrel 9 at 5-9 psi. to inflate the inner extruded tube and counteract the gas pressure between the two tubes, so that the inner extruded tube can pass over the tapered end of mandrel 4. Coolant liquid is supplied to the mandrel via supply tube 60, typically at 20-60° F. (−7-16° C.) and a flow of 5 gal. per minute at 80 psi. Since the spacing X between the two die orifices has been minimized, and with the melt and die lips temperatures controlled as explained, the extruded tubes emerging from the respective die orifices are at temperatures appropriate for mutual thermal fusion of the two tubes, and the temperatures of the two tubes are maintained in the good fusion range both because all of the inflating pressurized gas has been supplied through the heated die structure and is therefore at a temperature sufficiently high not to excessively cool the plastic and because the distance Z is minimized as explained. Thus, as mandrel 4 and the travelling molds coact to urge the inner extruded tube against the inner crests of the corrugations of the outer tube, a good fusion joint results. Since the plastic melt supplied from the extruder barrel through the die structure is neither worked in the sense of being rolled upon itself nor subjected to constrained shear, the rigid double wall polyvinyl chloride pipe resulting from the cooling action of the main length of mandrel 4 shows no significant brittleness resulting from polymer degradation.

With initial dry mixes within the general formulation given above, and with operating temperatures controlled as hereinbefore specified, good polyvinyl chloride double wall pipe has been formed with the apparatus as shown in FIGS. 3-3B and dimensional relationships as follows:

| PIPE DIAMETER | DISTANCE X | DISTANCE Z |
|---|---|---|
| 4 in. (100 mm.) | 0.2 in. (5 mm.) | 1.9 in. (49 mm.) |
| 4 in. (100 mm.) | 0.77 in. (20 mm.) | 3.1 in. (77 mm.) |
| 6 in. (150 mm.) | 0.27 in. (7 mm.) | 1.3 in. (33 mm.) |
| 6 in. (150 mm.) | 0.55 in. (14 mm.) | 1.3 in. (33 mm.) |
| 8 in. (200 mm.) | 0.43 in. (11 mm.) | 2.9 in. (74 mm.) |
| 8 in. (200 mm.) | 0.95 in. (24 mm.) | 2.9 in. (74 mm.) |

Polyvinyl chlorides useful according to the invention are homopolymers of such molecular weight as to have a Fikentscher K-value of 60-70, advantageously 62.5-67. At least one impact modifier is included, advantageously selected from the group consisting of the acrylic polymers and copolymers, acrylonitrile-butadiene-styrene copolymers, polyalphamethylstyrene and chlorinated polyethylene. Chlorinated polye&hylene is particularly advantageous and, when used, is included in an amount equal to at least 1% by weight, based on the total formulation. At least one wax type lubricant advantageously is employed, and advantageously both paraffin wax and a smaller proportion of polyethylene wax are used, and calcium stearate is included as an additional lubricant.

The following example is illustrative:

EXAMPLE 1

A conventional Krauss Maffei KMD 125 twin screw extruder was used to produce 12,000 ft. of 8 in. double wall pipe of the longitudinal cross section shown in FIG. 5, the extruder being equipped with the die, corrugating mold, inflating equipment and slaping and cooling mandrel described above with reference to FIGS. 1-3D and with conventional devices for continuously determining barrel temperatures, die temperatures, melt, temperature, coolant temperature and head pressure. The formulation was prepared in an intensive blender as a uniform free-flowing dry blend having the following composition:

| Ingredient | Percent by Weight |
|---|---|
| Polyvinyl chloride | 90.580 |
| Calcium carbonate | 2.717 |
| Acrylic polymer processing aid | 1.812 |
| Chlorinated polyethylene | 1.359 |
| Paraffin wax | 1.268 |
| Titanium dioxide | 0.906 |
| Calcium stearate | 0.453 |
| Carbon black pigment | 0.362 |
| Antimony stabilizer | 0.362 |
| Polyethylene wax | 0.181 |
| | 100.000 |

The polyvinyl chloride was a medium molecular weight homopolymer marketed under the trademark 225PG by Tenneco Polymers, Inc., Houston, TX, USA, with a relative viscosity (1% by weight in cyclohexanone at 25° C.) of 2.20, an inherent viscosity (0.2 g. per 100 ml. cyclohexanone) of 0.91 and a Fikentscher K-value (0.5 g. per 100 ml. cyclohexanone) of 66.5. The processing aid was an acrylic polymer type marketed under the trademark KM-9801 by Rohm & Haas Co., Philadelphia, PA, USA.

The outer die orifice 14 had a radial width of 0.064 in. (1.62 mm.) and an inner diameter of 7.2 in. (18.28 cm.). Inner die orifice 16 had a radial width of 0.028 in. (0.73 mm.) and an inner diameter of 6.96 in. (17.67 cm.). The axial spacing X, FIG. 3B, between the two die orifices was 0.775 in. (1.97 cm.), so that the ratio of X to the inner diameter of orifice 16 was 1:8.9. The drive motor of the extruder was operated at 2000 r.p.m., yielding a screw speed of 18 r.p.m. Head pressure commenced at 4680 psi. and was maintained below 4900 psi. throughout the run. Barrel temperatures were as follows:

| Zone A | 428–429° F. | (220–221° C.) |
|---|---|---|
| Zone B | 427–429° F. | (219–221° C.) |
| Zone C | 389–390° F. | (198–199° C.) |
| Zone D | 355–359° F. | (179–182° C.) |
| Zone E | 339–341° F. | (171–172° C.) |

Die body temperatures, including that at the adaptor flange, were maintained at at least 400° F. (204° C.). Melt temperature was maintained between 377° F. (192° C.) and 379° F. (193° C.) and the temperature of the extruded material at the die lips was continuously in the range 380°±10° F. (193.3°±5.56° C.). Extrusion rate was maintained at approximately 1040 lbs. per hour. Air pressure via passage 22 and orifice 23 was maintained at 6.6–8.1 psi. and air pressure via the innermost mandrel at 6.2–7.3 psi. The temperature of the mandrel downstream of distance Z was maintained at 44–59° F. (7–15° C.).

The finished pipe was of the cross section shown in FIG. 5, with an inner wall thickness of 0.040 in. (1.02 mm.), an outer wall thickness of 0.035 in. (0.89 mm.) and a radial space between the inner face of the inner wall and the outer face of the outer wall of 0.360 in. (9.15 mm.). In impact testing under ASTM D 2444-80 with a mean of 160 ft. lbs., 14 of 20 samples passed 80 ft. lbs. with a 20 lb. Type B TUP. In testing for external loading properties by ASTM D 2412-77, a minimum pipe stiffness of 50 psi. at 5% (0.4 in.) deflection was obtained. For flattening tests under ASTM D 2412-77, samples were deflected 60% of nominal diameter. Testing 12.5 ft. (3.8 mm.) samples supported at ends and subjected to 136° F. (58° C.), heat bowing of ⅜ in. (13.3 mm.) maximum was observed, with all samples returning to original straightness when cooled to ambient temperature. FIG. 6 is a scanning electron micrograph at 20X of a cut at right angles to one of the corrugations of the outer pipe. While the effect of cutting can be observed, it will be noted that no line of demarcation can be observed between the inner wall and the outer wall where, at the inner crest of the corrugation, the two walls are fused together.

What is claimed is:

1. The method of producing a double wall PVC pipe comprising the continuous steps of
   extruding concentric outer and inner tubes of PVS from respective inner and outer die orifices, said inner die orifice spaced from said outer die orifice in the extrusion direction by a distance form 0 to 2.5 inches.

inflating by pressurized gas the outer PVC tube while in a state of thermal fusion against a surrounding annular transversely corrugated mold surface which is traveling in the extrusion direction to form a corrugated outer tube having inner crests, expanding by pressurized gas the inner PVC tube to fuse it to said outer tube crests while advancing said inner PVC tube onto a coaxial shaping and cooling mandrel which commences at an upstream tip spaced from the inner die orifice and tapers smoothly outwardly to a point of larger transverse dimension substantially equal to an inner diameter of the PVC pipe to be produced, said point being spaced from the outer die orifice in the extrusion direction by a distance which is less than the PVC pipe diameter such that the temperature of both the inner and outer PVC tubes at said point is at least equal to the fusion temperature of the PVC and cooling the resulting double wall PVC pipe to a solid state such that scanning electron micrographs of an enlargement at 20 times exhibits no line of demarcation at the fused joint between the outer and inner PVC tubes.

2. The method according to claim 1, wherein the PVC comprises at least 85% by weight of polyvinyl chloride, and at least one impact modifier selected from the group consisting of chlorinated polyethylene, acrylic polymers and copolymers, acrylonitrile-butadiene-styrene copolymers and polyalphamethylstyrene.

3. The method according to claim 2, wherein the impact modifier is chlorinated polyethylene and constitutes at least 1% of the formulation weight.

4. The method according to claim 2, wherein the PVC further comprises at least 0.1% by weight of at least one wax as a lubricant.

5. The method according to claim 2, wherein the temperature is maintained at about 360-420° F. (188-216° C.).

6. The method according to claim 5, wherein the temperature is maintained at about 370° F. to 390° F.

7. The method according to claim 5, wherein the temperature is maintained at about 377-379° F. (192-193° C.).

8. The method according to claim 2, wherein the inner die orifice is spaced form the outer die orifice in the extrusion direction by a distance such that the ratio of that distance to the inner diameter of the outer die orifice is in the range of from about 1:8 to about 1:22.

9. The method according to claim 1, wherein the gas supplied under pressure is heated by the die structure.

* * * * *